(12) United States Patent
Klotz et al.

(10) Patent No.: US 12,741,588 B2
(45) Date of Patent: Sep. 22, 2026

(54) SYSTEMS AND METHODS FOR INTERIOR LIGHTING AND DISPLAY SCREEN SYNCHRONIZATION IN A VEHICLE

(71) Applicant: GM GLOBAL TECHNOLOGY OPERATIONS LLC, Detroit, MI (US)

(72) Inventors: Justin Klotz, Rochester Hills, MI (US); Joseph Mitchell, Troy, MI (US); Dakota H. Rosell, Wolverine Lake, MI (US); Kaelan Sebastian Goff, Brighton, MI (US); Joel Benjamin Thompson, Sterling Heights, MI (US)

(73) Assignee: GM GLOBAL TECHNOLOGY OPERATIONS LLC, Detroi, MI (US)

( * ) Notice: Subject to any disclaimer, the term of this patent is extended or adjusted under 35 U.S.C. 154(b) by 83 days.

(21) Appl. No.: 18/813,430

(22) Filed: Aug. 23, 2024

(65) Prior Publication Data

US 2026/0054643 A1 Feb. 26, 2026

(51) Int. Cl.

| | |
|---|---|
| ***B60Q 3/80*** | (2017.01) |
| ***B60K 35/22*** | (2024.01) |
| ***B60Q 3/74*** | (2017.01) |
| ***H05B 45/20*** | (2020.01) |
| ***H05B 47/155*** | (2020.01) |

(52) U.S. Cl.

CPC ................ *B60Q 3/80* (2017.02); *B60K 35/22* (2024.01); *B60Q 3/74* (2017.02); *H05B 45/20* (2020.01); *H05B 47/155* (2020.01); *B60K 2360/33* (2024.01); *B60Q 2500/30* (2022.05)

(58) Field of Classification Search

CPC .......... B60Q 3/74; B60Q 3/80; H05B 47/155; B60K 35/22

See application file for complete search history.

(56) References Cited

U.S. PATENT DOCUMENTS

| | | | | |
|---|---|---|---|---|
| 2019/0135174 | A1* | 5/2019 | Brown ..................... | B60Q 3/74 |
| 2021/0261050 | A1* | 8/2021 | Sobhany .................. | B60Q 3/80 |
| 2025/0324501 | A1* | 10/2025 | Hur ...................... | H05B 47/196 |

FOREIGN PATENT DOCUMENTS

| | | |
|---|---|---|
| DE | 102021126817 A1 | 4/2023 |

* cited by examiner

*Primary Examiner* — Abdulmajeed Aziz
*Assistant Examiner* — Nathaniel J Lee
(74) *Attorney, Agent, or Firm* — Ingrassia Fisher & Lorenz, LLP | IFL

(57) ABSTRACT

Systems and methods for interior lighting and display screen synchronization in a vehicle are provided. A content area is determined on a display screen in the vehicle. The content area is divided into a plurality of geometric content area zones. Each of the plurality of geometric content area zones is mapped to lamps associated with a corresponding one of a plurality of interior light zones in the vehicle. A dominant color is determined in each of the plurality of geometric content area zones. An illumination command is issued to the lamps in each of the plurality of interior light zones to illuminate the interior light zone with the dominant color associated with the corresponding one of the plurality of geometric content zones.

20 Claims, 6 Drawing Sheets

SYSTEMS AND METHODS FOR INTERIOR LIGHTING AND DISPLAY SCREEN SYNCHRONIZATION IN A VEHICLE

INTRODUCTION

The technical field generally relates to vehicles, and more particularly relates to systems and methods for interior lighting and display screen synchronization in a vehicle.

Vehicles often include entertainment systems that use display screens in the vehicle to provide entertainment media content. Synchronizing and matching colors between the entertainment media content on the display screen and interior lighting in the vehicle may provide a user of the vehicle with a harmonious and immersive experience.

Accordingly, it is desirable to provide systems and methods for interior lighting and display screen synchronization in a vehicle. Other desirable features and characteristics will become apparent from the subsequent detailed description and the appended claims, taken in conjunction with the accompanying drawings and the foregoing technical field and background.

SUMMARY

An interior lighting and display screen synchronization system for a vehicle includes least one processor and at least one memory communicatively coupled to the at least one processor. The at least one memory includes instructions that upon execution by the at least one processor, cause the at least one processor to: determine a content area on a display screen in the vehicle; divide the content area into a plurality of geometric content area zones; map each of the plurality of geometric content area zones to lamps associated with a corresponding one of a plurality of interior light zones in the vehicle; determine a dominant color in each of the plurality of geometric content area zones; and issue a first illumination command to the lamps in each of the plurality of interior light zones to illuminate the interior light zone with the dominant color associated with the corresponding one of the plurality of geometric content zones.

In at least one embodiment, the at least one memory further includes instructions that upon execution by the at least one processor, cause the at least one processor to: identify a first application displaying content on the display screen; and determine a height and a width of the content area on the display screen associated with the first application.

In at least one embodiment, the at least one memory further includes instructions that upon execution by the at least one processor, cause the at least one processor to divide the content area into the plurality of geometric content area zones, wherein a number of geometric content area zones in the plurality of geometric content area zones is based on the first application.

In at least one embodiment, the at least one memory further includes instructions that upon execution by the at least one processor, cause the at least one processor to map each of the plurality of geometric content area zones to the lamps associated with the corresponding one of the plurality of interior light zones in the vehicle using a mapping table, wherein the mapping table defines associations between the geometric content zones and the lamps in the interior light zones.

In at least one embodiment, the at least one memory further includes instructions that upon execution by the at least one processor, cause the at least one processor to determine the content area on the display screen in the vehicle by identifying a horizontal offset and a vertical offset of the content area with respect to a horizontal edge and a vertical edge of the display screen.

In at least one embodiment, the at least one memory further includes instructions that upon execution by the at least one processor, cause the at least one processor to determine the dominant color in each of the plurality of geometric content area zones by identifying a color with a highest number of pixels in the geometric content area zone as the dominant color.

In at least one embodiment, the at least one memory further includes instructions that upon execution by the at least one processor, cause the at least one processor to: determine a vehicle status; issue the first illumination command to the lamps in each of the plurality of interior light zones to illuminate the interior light zone with the dominant color associated with the corresponding one of the plurality of geometric content zones at a first time; determine an updated dominant color in each of the plurality of geometric content area zones; and issue a second illumination command to the lamps in each of the plurality of interior light zones to illuminate the interior light zone with the updated dominant color associated with the corresponding one of the plurality of geometric content zones at a second time in accordance with an illumination update frequency based on the vehicle status.

A method of synchronizing interior lighting and with a display screen in a vehicle includes determining a content area on a display screen in the vehicle; dividing the content area into a plurality of geometric content area zones; mapping each of the plurality of geometric content area zones to lamps associated with a corresponding one of a plurality of interior light zones in the vehicle; determining a dominant color in each of the plurality of geometric content area zones; and issuing a first illumination command to the lamps in each of the plurality of interior light zones to illuminate the interior light zone with the dominant color associated with the corresponding one of the plurality of geometric content zones.

In at least one embodiment, the method further includes: identifying a first application displaying content on the display screen; and determining a height and a width of the content area on the display screen associated with the first application.

In at least one embodiment, the method further includes dividing the content area into the plurality of geometric content area zones, wherein a number of geometric content area zones in the plurality of geometric content area zones is based on the first application.

In at least one embodiment, the method further includes mapping each of the plurality of geometric content area zones to the lamps associated with the corresponding one of the plurality of interior light zones in the vehicle using a mapping table, wherein the mapping table defines associations between the geometric content zones and the lamps in the interior light zones.

In at least one embodiment, the method further includes determining the content area on the display screen in the vehicle by identifying a horizontal offset and a vertical offset of the content area with respect to a horizontal edge and a vertical edge of the display screen.

In at least one embodiment, the method further includes determining the dominant color in each of the plurality of geometric content area zones by identifying a color with a highest number of pixels in the geometric content area zone as the dominant color.

In at least one embodiment, the method further includes: determining a vehicle status; issuing the first illumination command to the lamps in each of the plurality of interior light zones to illuminate the interior light zone with the dominant color associated with the corresponding one of the plurality of geometric content zones at a first time; determining an updated dominant color in each of the plurality of geometric content area zones; and issuing a second illumination command to the lamps in each of the plurality of interior light zones to illuminate the interior light zone with the updated dominant color associated with the corresponding one of the plurality of geometric content zones at a second time in accordance with an illumination update frequency based on the vehicle status.

A vehicle including an interior lighting and display screen synchronization system includes at least one processor and at least one memory communicatively coupled to the at least one processor. The at least one memory includes instructions that upon execution by the at least one processor, cause the at least one processor to: determine a content area on a display screen in the vehicle; divide the content area into a plurality of geometric content area zones; map each of the plurality of geometric content area zones to lamps associated with a corresponding one of a plurality of interior light zones in the vehicle; determine a dominant color in each of the plurality of geometric content area zones; and issue a first illumination command to the lamps in each of the plurality of interior light zones to illuminate the interior light zone with the dominant color associated with the corresponding one of the plurality of geometric content zones.

In at least one embodiment, the at least one memory further includes instructions that upon execution by the at least one processor, cause the at least one processor to: identify a first application displaying content on the display screen; and determine a height and a width of the content area on the display screen associated with the first application.

In at least one embodiment, the at least one memory further includes instructions that upon execution by the at least one processor, cause the at least one processor to divide the content area into the plurality of geometric content area zones, wherein a number of geometric content area zones in the plurality of geometric content area zones is based on the first application.

In at least one embodiment, the at least one memory further includes instructions that upon execution by the at least one processor, cause the at least one processor map each of the plurality of geometric content area zones to the lamps associated with the corresponding one of the plurality of interior light zones in the vehicle using a mapping table, wherein the mapping table defines associations between the geometric content zones and the lamps in the interior light zones.

In at least one embodiment, the at least one memory further includes instruction that upon execution by the at least one processor, cause the at least one processor to determine the content area on the display screen in the vehicle by identifying a horizontal offset and a vertical offset of the content area with respect to a horizontal edge and a vertical edge of the display screen.

In at least one embodiment, the at least one memory further includes instructions that upon execution by the at least one processor, cause the at least one processor to determine the dominant color in each of the plurality of geometric content area zones by identifying a color with a highest number of pixels in the geometric content area zone as the dominant color.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
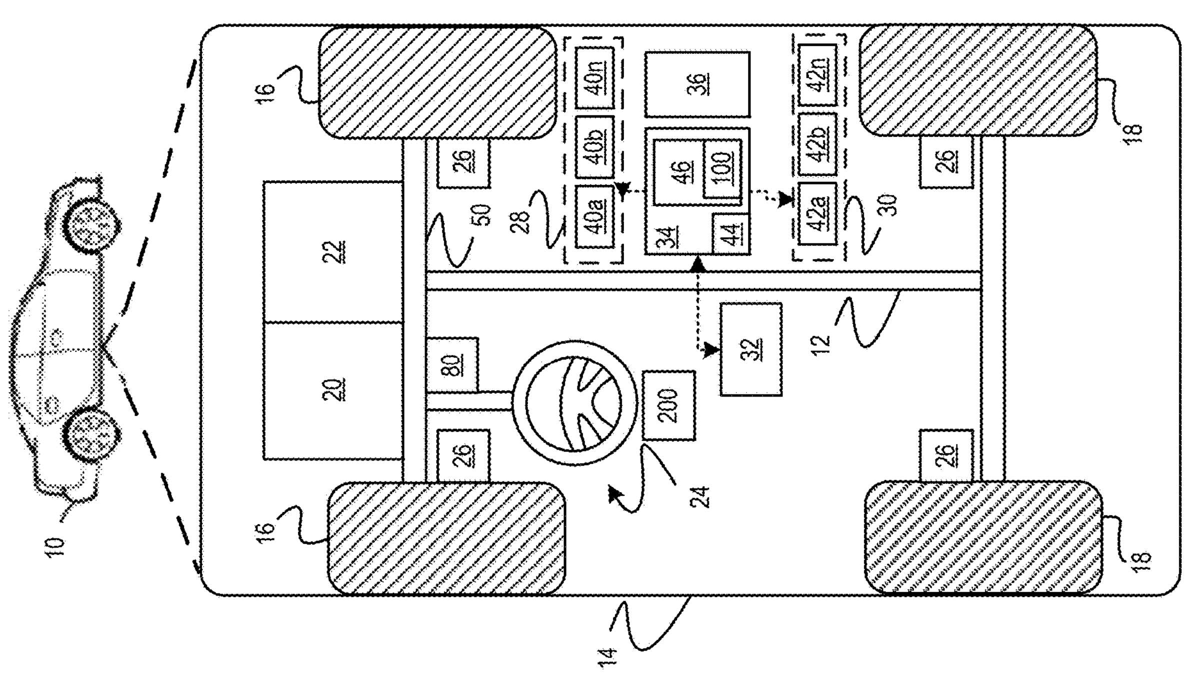
FIG. 1 is a functional block diagram of a vehicle including an interior lighting and display screen synchronization system in accordance with at least one embodiment.

Referring to FIG. 1, a functional block diagram of a vehicle including an interior lighting and display screen synchronization system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40*a*-40*n* can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42*a*-42*n* that control one or more vehicle features such as, but not limited to, one or more vehicle wheels 16, 18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
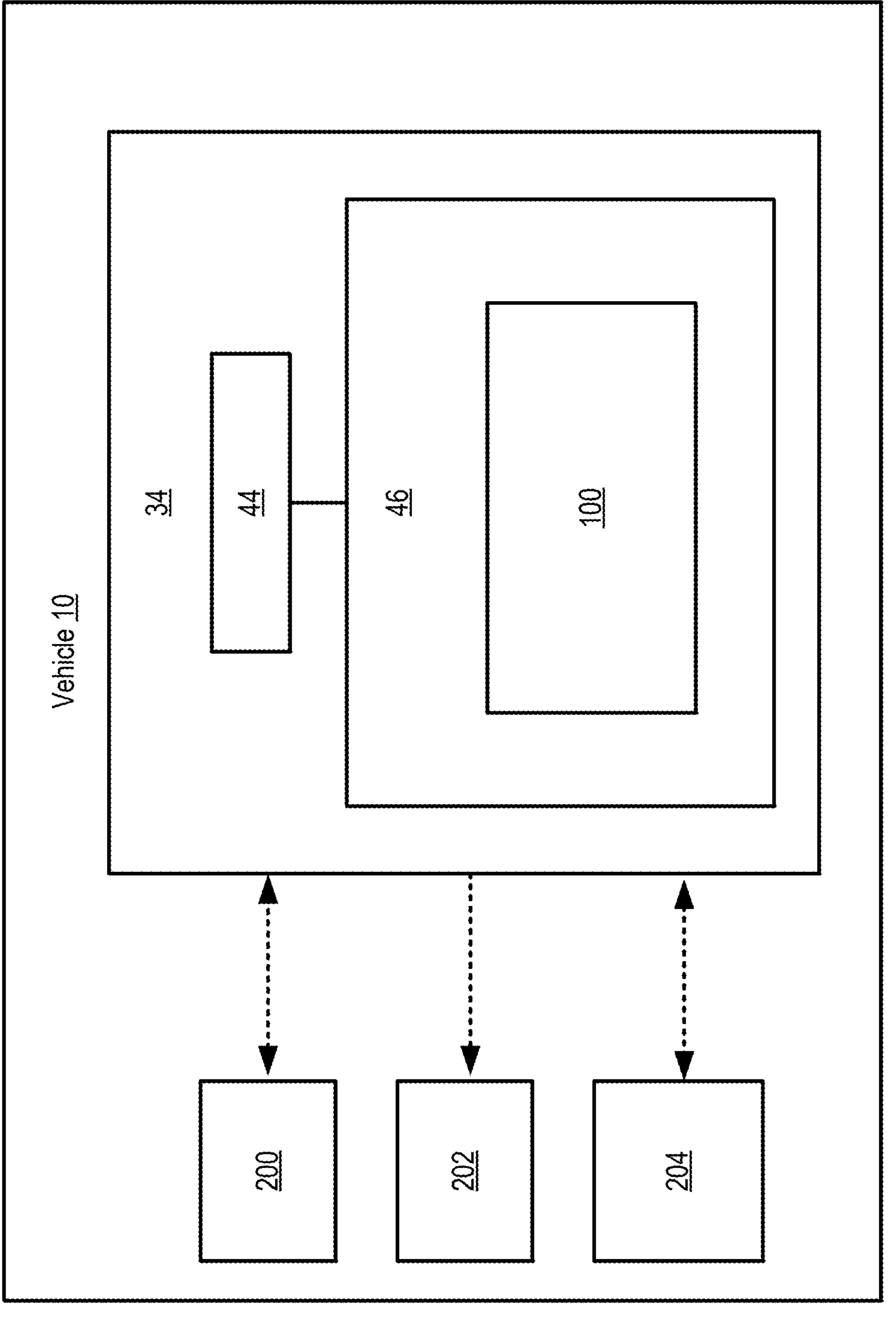
FIG. 2 is a functional block diagram of a controller including an interior lighting and display screen synchronization system in accordance with at least one embodiment.

Referring to FIG. 2, a functional block diagram of a controller 34 including an interior lighting and display screen synchronization system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the interior lighting and display screen synchronization system 100. The controller 34 is configured to be communicatively coupled to at least one display screen 200, a plurality of lamps 202, and a central computing device 204. The display screen 200 is configured to display content associated with an applications that is actively running in the vehicle 10. The lamps 202 are disposed in the interior of a vehicle 10. Each of the lamps 202 is configured to generate light in one of a plurality of different colors. In at least one embodiment, the central computing device 204 is another controller 34 in the vehicle 10. The controller 34 shown in FIG. 2 may include additional components that facilitate operation of the interior lighting and display screen synchronization system 100. The operation of the interior lighting and display screen synchronization system 100 will be described in greater detail below.

Figure 3:
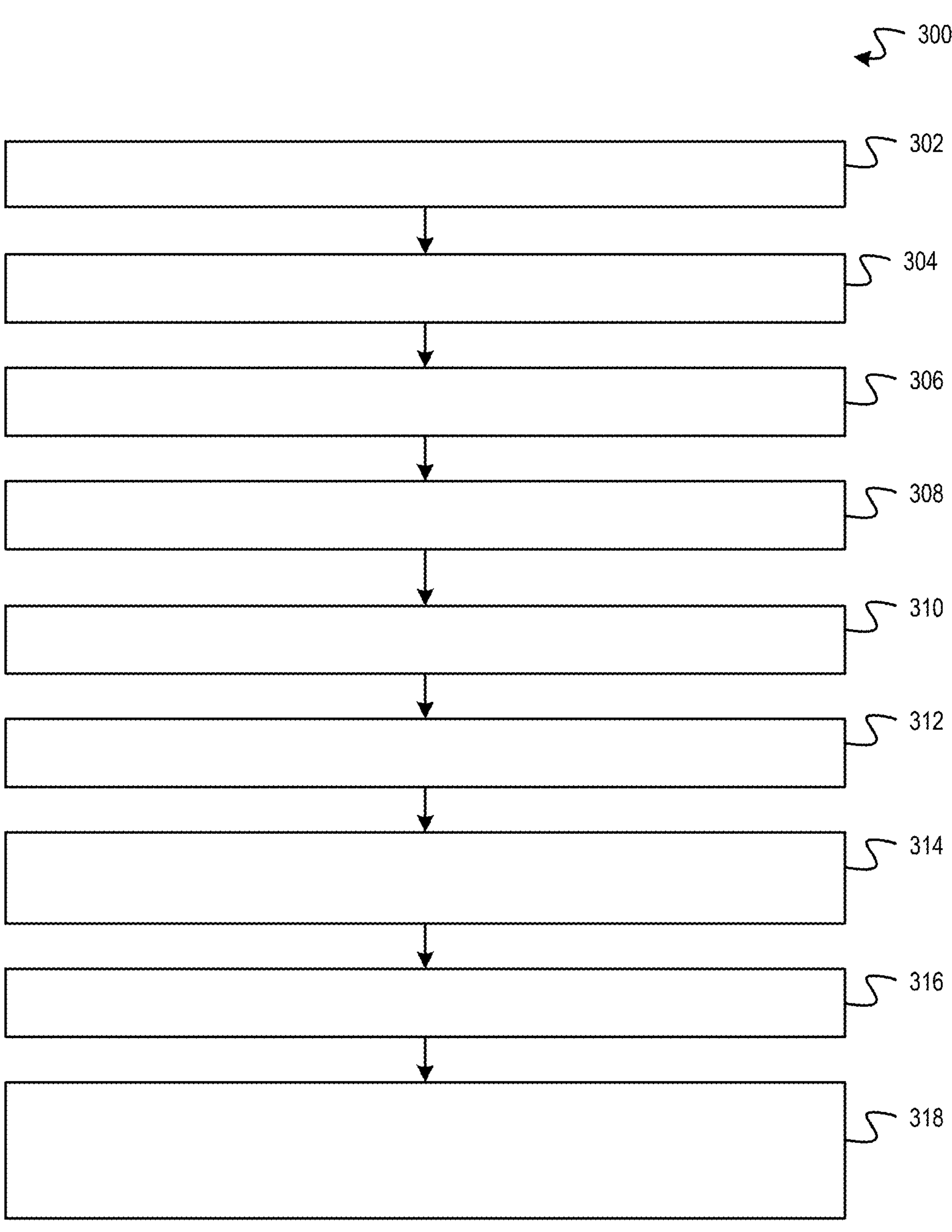
FIG. 3 is a flowchart representation of a method of synchronizing interior lighting and with a display screen in a vehicle in accordance with at least one embodiment.

Referring to FIG. 3, a flowchart representation of a method of synchronizing interior lighting and with a display screen in a vehicle 10 in accordance with at least one embodiment in accordance with at least one embodiment is shown. The method 300 will be described with reference to an exemplary implementation of an embodiment of an interior lighting and display screen synchronization system 100. As can be appreciated in light of the disclosure, the order of operation within the method 300 is not limited to the sequential execution as illustrated in FIG. 3 but may be performed in one or more varying orders as applicable and in accordance with the present disclosure.

At 302, the interior lighting and display screen synchronization system 100 identifies an application associated with content displayed on a display screen 200 in the vehicle 10. In at least one embodiment, the interior lighting and display screen synchronization system 100 issues a request for an identification of the application associated with the content being displayed on the display screen 200 to a central computing device 204 of the vehicle 10. The central computing device 204 provides the identification of the application to the interior lighting and display screen synchronization system 100 in response to the request. In at least one embodiment, the identification of the application is an application identifier.

At 304, the interior lighting and display screen synchronization system 100 determines a content area on the display screen 200 based on the identified application. An application uses an application specific content area to display content. The identified application is used to determine the associated application specific content area. In at least one embodiment, the interior lighting and display screen synchronization system 100 stores associations between application identifiers of different applications and the application specific content areas at the interior lighting and display screen synchronization system 100. The interior lighting and display screen synchronization system 100 retrieves the application specific content area using the application identifier received from the central computing device 204.

At 306, the interior lighting and display screen synchronization system 100 determines a height and a width of the content area. As mentioned above, each application uses an application specific content area to display content on the display screen 200. In at least one embodiment, the interior lighting and display screen synchronization system 100 stores associations between the application identifiers of different applications and the application specific content areas at the interior lighting and display screen synchronization system 100. The stored application specific content areas are defined by a pre-defined height and a pre-defined width. The interior lighting and display screen synchronization system 100 determines the pre-defined height and the pre-defined width associated with the retrieved application specific content area.

At 308, the interior lighting and display screen synchronization system 100 identifies a horizontal offset and a vertical offset of the content area relative to the entire display screen 200. As mentioned above, each application uses an application specific content area to display content on the display screen 200. In at least one embodiment, the interior lighting and display screen synchronization system 100 stores associations between the application identifiers of different applications and the application specific content areas at the interior lighting and display screen synchronization system 100. The stored application specific content areas are defined by a horizontal offset and a vertical offset of the application specific content area with respect to the entire display screen 200. The interior lighting and display screen synchronization system 100 identifies the pre-defined horizontal offset and the vertical offset associated with the retrieved application specific content area.

At 310, the interior lighting and display screen synchronization system 100 defines the content area in pixels of the display screen 200. The interior lighting and display screen synchronization system 100 has determined the dimensions and the placement of the content area on the display screen 200 based on the pre-defined height, the pre-defined width, the pre-defined horizontal offset, and the pre-defined vertical offset. The interior lighting and display screen synchronization system 100 uses the dimensions and the placement of the content area in the display screen 200 to define the pixels in the display screen 200 used to display content in the content area.

At 312, the interior lighting and display screen synchronization system 100 divides the content area into a plurality of geometric content area zones. In at least one embodiment, the geometric content area zones have rectangular shapes. In at least one embodiment, the geometric content area zones have square shapes. In at least one embodiment, the geometric content area zones have non-rectangular shapes. Each application is associated with a pre-defined number of geometric content area zones.

In at least one embodiment, the interior lighting and display screen synchronization system 100 stores associations between the application identifiers of different applications and the pre-defined number of geometric content area zones at the interior lighting and display screen synchronization system 100. The interior lighting and display screen synchronization system 100 retrieves the pre-defined number of geometric content area zones associated with the application identifier and divides the content area into the pre-defined number of geometric content area zones.

The interior lighting and display screen synchronization system 100 defines the height and the width of the geometric content area zones. The interior lighting and display screen synchronization system 100 identifies the specific pixels in each geometric content area zone based on the height of the geometric content area zone, the width of the geometric content area zone, the horizontal offset of the geometric content area zone with respect to the entire screen and the vertical offset of the geometric content area zone with respect to the entire screen. The horizontal offset and the vertical offset of each of the geometric content area zone with respect to the entire screen is calculated based on a location of the geometric content area zone within the content area and the pre-defined horizontal offset of the content area and the pre-defined vertical offset of the content area.

At 314, the interior lighting and display screen synchronization system 100 maps each of the geometric content area zones in the content area to lamps 202 in a corresponding interior light zone. Each of the plurality of geometric content area zones corresponds to one of a plurality of interior light zones in the vehicle 10. Each of the plurality of interior light zones includes a plurality of lamps 202. In at least one embodiment, a mapping table stored at the interior lighting and display screen synchronization system 100 defines associations between each geometric content area zone and the lamps in the associated interior light zone. The interior lighting and display screen synchronization system 100 maps each of the geometric content area zones in the content area to lamps 202 in a corresponding interior light zone using the mapping table.

At 316, the interior lighting and display screen synchronization system 100 determines a dominant color in each geometric content area zone in the content area. In at least one embodiment, the interior lighting and display screen synchronization system 100 counts a number of pixels associated with the display of each color in each geometric content area zone. The interior lighting and display screen synchronization system 100 identifies the color with the highest pixel count in each geometric content area zone as the dominant color for that geometric content area zone. In at least one embodiment, the interior lighting and display screen synchronization system 100 determines a dominant color in each of the geometric content area zone in the content area using a clustering algorithm.

At 318, the interior lighting and display screen synchronization system 100 issues an illumination command to the lamps 202 in each of the interior light zones to illuminate the interior light zone with the dominant color corresponding to the associated geometric content area zone on the display screen 200. Each of the geometric content area zones on the display screen 200 corresponds to an interior light zone in the vehicle 10. Each interior light zone includes a plurality of lamps 202. The interior lighting and display screen synchronization system 100 issues the illumination command to the lamps 202 in each of the interior light zones to generate a light that corresponds to the dominant color of the associated geometric content area zone on the display screen 200. For example, if the dominant color for a geometric content area zone on the display screen 200 is blue, the interior lighting and display screen synchronization system 100 issues a command to the lamps 202 in the interior light zone associated with that geometric content area zone to generate a blue color light.

The interior lighting and display screen synchronization system 100 determines updated dominant colors in each of the geometric content area zones and issues illumination commands to the lamps 202 in each of the associated interior light zones to update the generated light in accordance with the updated dominant colors.

In at least one embodiment, the interior lighting and display screen synchronization system 100 determines a vehicle status of the vehicle 10. Examples of the vehicle status include, but are not limited to, a driving status and a parked status. The interior lighting and display screen synchronization system 100 identifies an interior light zone illumination update frequency based on the vehicle status. For example, if the vehicle status is a driving status, the interior lighting and display screen synchronization system 100 identifies a driving interior light zone illumination update frequency and if the vehicle status is a parked status, the interior lighting and display screen synchronization system 100 identifies a parked interior light zone illumination update frequency. The parked interior light zone illumination update frequency is greater than the driving interior light zone illumination update frequency. The driving interior light zone illumination update frequency is a lower frequency to avoid distracting a driver of the vehicle 10 when the vehicle 10 is in the driving status.

Figures 4, 5, 6:
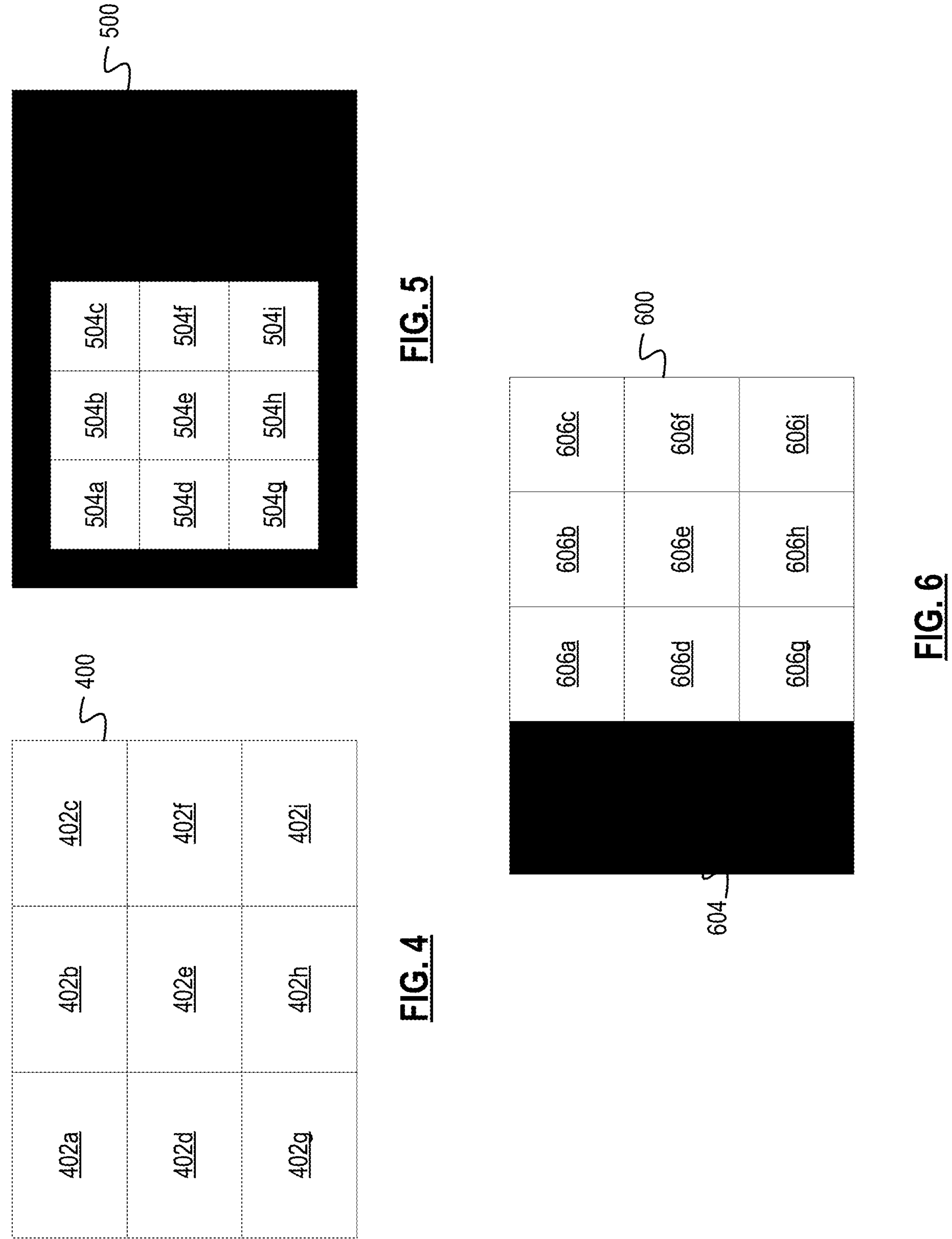
FIG. 4 is a block diagram representation of an exemplary display screen including a full display screen content area in accordance with at least one embodiment.
FIG. 5 is a block diagram representation of an exemplary display screen including a partial display screen content area in accordance with at least one embodiment.
FIG. 6 is a block diagram representation of an exemplary display screen including generic screen content area in accordance with at least one embodiment.

Referring to FIG. 4, a block diagram representation of an exemplary display screen including a full display screen content area 400 in accordance with at least one embodiment is shown. Many applications use the entire display screen as the content area 400 to display content. An example of such an application is a movie application. The content area 400 has been divided by the interior lighting and display screen synchronization system 100 into nine geometric content area zones 400*a*, 400*b*, 400*c*, 400*d*, 400*e*, 400*f*, 400*g*, 400*h*, 400*i*.

Referring to FIG. 5, a block diagram representation of an exemplary display screen 500 including a partial display screen content area 502 in accordance with at least one embodiment is shown. Many applications use a portion of the display screen 500 as the content area 502 to display content. An example of such an application is a music playback application. The music playback application uses the content area 502 to display cover art associated with the music being played by the music playback application. The content area 502 has been divided by the interior lighting and display screen synchronization system 100 into nine geometric content area zones 504*a*, 504*b*, 504*c*, 504*d*, 504*e*, 504*f*, 504*g*, 504*h*, 504*i*. The number of geometric content area zones is associated with the application that is displaying the content on the display screen 500.

Referring to FIG. 6, a block diagram representation of an exemplary display screen 600 including a generic screen content area 602 in accordance with at least one embodiment is shown. Many applications include a generic screen content area 602 and an application tray and/or navigation bar. The interior lighting and display screen synchronization system 100 defines the content area 602 as the entire display screen 600 minus the area of the screen 604 covered by the application tray and/or navigation bar. The content area 602 has been divided by the interior lighting and display screen synchronization system 100 into nine geometric content area zones 606*a*, 606*b*, 606*c*, 606*d*, 606*e*, 606*f*, 606*g*, 606*h*, 606*i*. The number of geometric content area zones is associated with the application that is displaying the content on the display screen 600.

Figure 7:
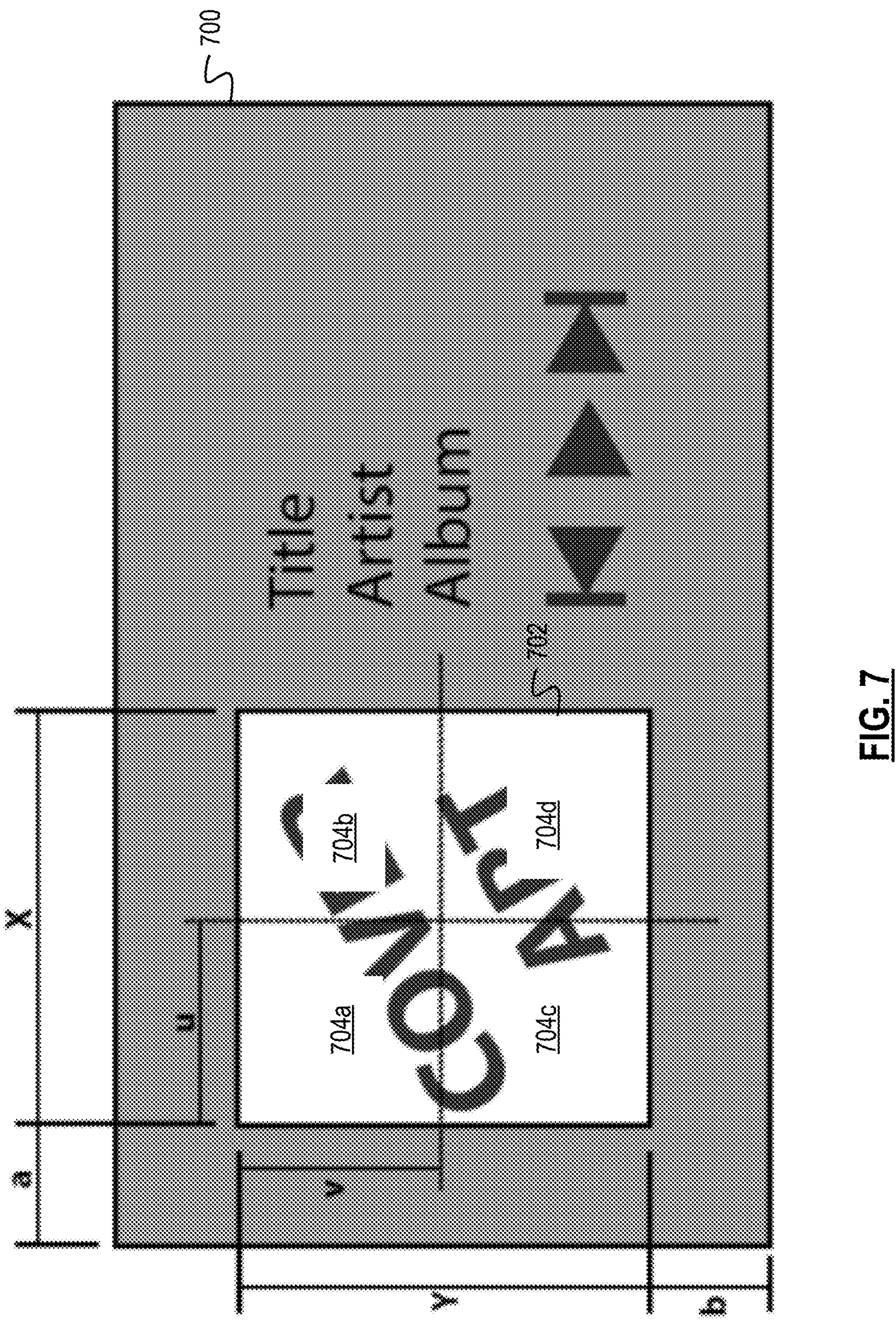
FIG. 7 is a block diagram representation of dimensions associated with an exemplary position of a content area on a display screen in accordance with at least one embodiment.

Referring to FIG. 7, a block diagram representation of dimensions associated with an exemplary position of a content area 702 on a display screen 700 in accordance with at least one embodiment is shown. The interior lighting and display screen synchronization system 100 has determined a pre-defined width X and a pre-defined height Y of the content area 702 associated with the application that is displaying content on the display screen 700. The interior lighting and display screen synchronization system 100 has determined a pre-defined horizontal offset a and a pre-defined vertical offset b of the content area 702 with respect to the display screen 700 associated with the application that is displaying the content on the display screen 700. The content area 602 has been divided by the interior lighting and display screen synchronization system 100 into four geometric content area zones 704*a*, 704*b*, 704*c*, 704*d*. The number of geometric content area zones is associated with the application that is displaying the content on the display screen 700.

Figure 8:
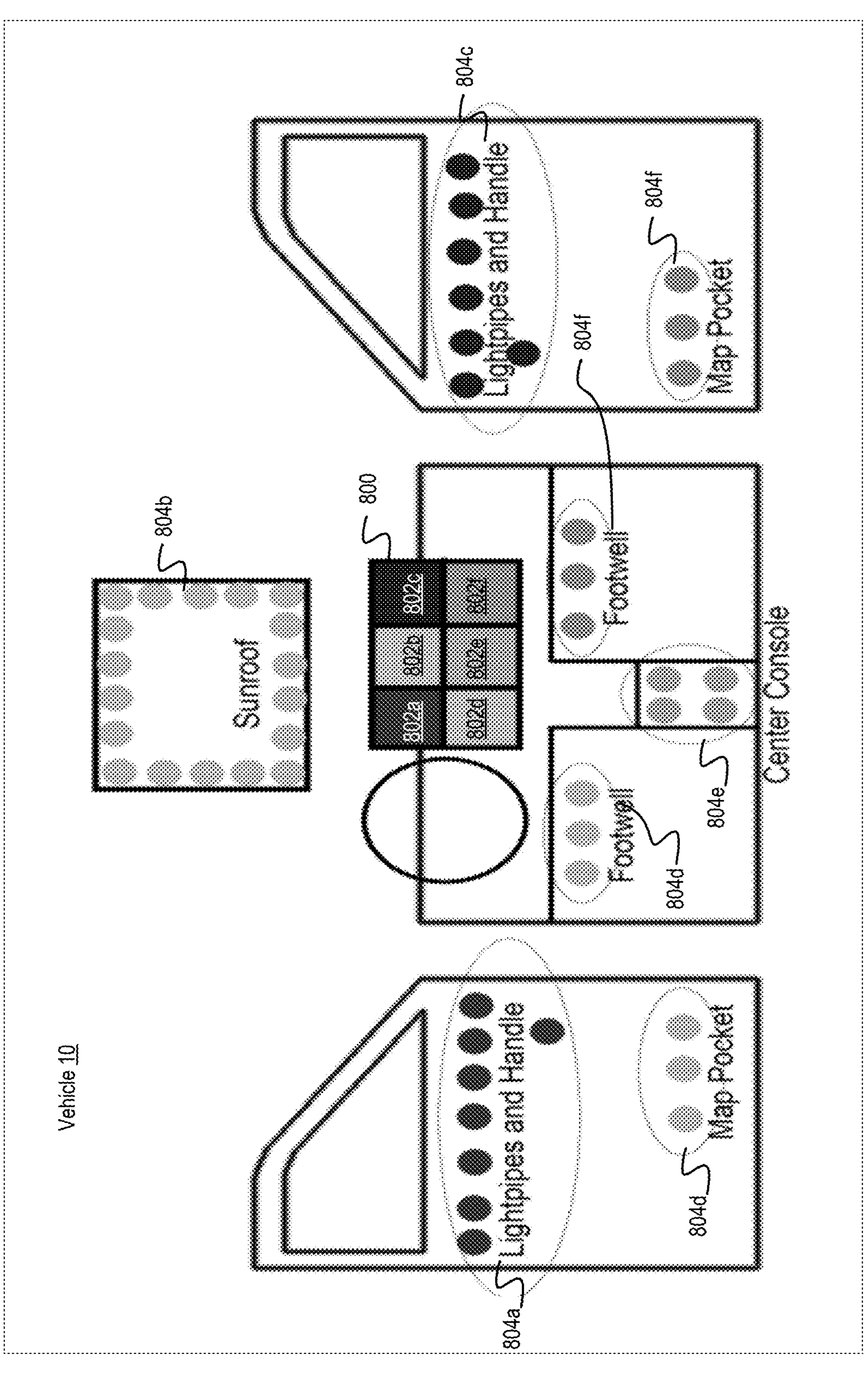
FIG. 8 is a diagrammatic representation of exemplary geometric content area zones on a display screen with corresponding interior light zones in a vehicle in accordance with at least one embodiment.

Referring to FIG. 8, a diagrammatic representation of exemplary geometric content area zones 802*a*, 802*b*, 802*c*, 802*d*, 802*e*, 802*f* on a display screen 800 with corresponding interior light zones 804*a*, 804*b*, 804*c*, 804*d*, 804*e*, 804*f* in a vehicle 10 in accordance with at least one embodiment is shown. The content area covers the entire display screen 800. The content area has been divided by the interior lighting and display screen synchronization system 100 into six geometric content area zones 802*a*, 802*b*, 802*c*, 802*d*, 802*e*, 802*f*. The number of geometric content area zones is associated with the application that is displaying the content on the display screen 800. Each of the geometric content area zones 802*a*, 802*b*, 802*c*, 802*d*, 802*e*, 802*f* corresponds to an interior light zone 804*a*, 804*b*, 804*c*, 804*d*, 804*e*, 804*f*.

For example, the geometric content area zone 802*a* on the display screen 800 corresponds to the interior light zone 804*a*. The interior light zone 804*a* includes lamps 202 disposed in the light pipes and the handle of a driver side door of the vehicle 10. The geometric content area zone 802*b* on the display screen 800 corresponds to the interior light zone 804*b*. The interior light zone 804*b* includes lamps 202 disposed in the sunroof of the vehicle 10. The geometric content area zone 802*c* on the display screen 800 corresponds to the interior light zone 804*c*. The interior light zone 804*c* includes lamps 202 disposed in the light pipes and the handle of a passenger side door of the vehicle 10. The geometric content area zone 802*d* on the display screen 800 corresponds to the interior light zone 804*d*. The interior light zone 804*d* includes lamps 202 disposed in the map pocket and the footwell on the driver side of the vehicle 10. The geometric content area zone 802*e* on the display screen 800 corresponds to the interior light zone 804*e*. The interior light zone 804*e* includes lamps 202 disposed in the center console of the vehicle 10. The geometric content area zone 802*f* on the display screen 800 corresponds to the interior light zone 804*f*. The interior light zone 804*f* includes lamps 202 disposed in the map pocket and the footwell on the passenger side of the vehicle 10.

The use of an interior lighting and display screen synchronization system 100 removes a need for scripting animations for automotive interior lighting systems while providing a method to dynamically animate a lighting system in a vehicle 10 in harmony with what appears on an in-vehicle display screen 200 in real time.

Using a layer of software to read the dominant color on several geometric content area zones of a display screen 200 and mapping each geometric content area zone to an interior light zone including lamps 202, colors on the display screen 200 can be "extended" beyond the display screen 200 and throughout the cabin of the vehicle 10. Depending on the active application, the geometric content area zones can be adjusted to handle various on-screen content such as a full screen movie, the cover art of streaming music, or standard in-vehicle menus.

The use of an interior lighting and display screen synchronization system 100 provides a unique and standardized immersive experience. Unlike alternative lighting spaces such as the consumer electronic market, a vehicle 10 provides a unique 3-dimensional immersive environment where the position, placement, and number of lamps 202 are guaranteed. This ensures a standardized immersive experience for every user as vehicle lighting does not require optional accent lighting. As an automotive manufacturer with complete knowledge and control of the media source, display screen 200, and interior lamps 202, dynamic geometric content area zones with varying size and locations can be used. For example, this could exclude navigation bars, dead space, and other user interface elements on the display screen 200 to focus on desired content in the content area of display screen 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An interior lighting and display screen synchronization system for a vehicle comprising:

at least one processor; and at least one memory communicatively coupled to the at least one processor, the at least one memory comprising instructions that upon execution by the at least one processor, cause the at least one processor to:

store associations between a plurality of application identifiers and a plurality of application specific content areas on a display screen of the vehicle, wherein:

each of the plurality of application identifiers is associated with a corresponding application;

the application specific content area of the corresponding application on the display screen is used to display content associated with the application; and each of the plurality of application specific content areas is defined by a pre-defined height, a pre-defined width, a pre-defined horizontal offset with respect to a horizontal edge of the display screen, and a pre-defined vertical offset with respect to a vertical edge of the display screen;

receive a first application identifier associated with first content displayed on the display screen from a central computing device of the vehicle, wherein the first application identifier is associated with a first application;

retrieve a first application specific content area associated with the first application identifier from the stored associations between the plurality of application identifiers and the plurality of application specific content areas;

determine the first application specific content area on the display screen based on a first pre-defined height, a first pre-defined width, a first pre-defined horizontal offset, and a first pre-defined vertical offset of the first application specific content area;

divide the first application specific content area on the display screen into a plurality of geometric content area zones;

map each of the plurality of geometric content area zones to lamps associated with a corresponding one of a plurality of interior light zones in the vehicle;

determine a dominant color in each of the plurality of geometric content area zones; and issue a first illumination command to the lamps in each of the plurality of interior light zones to illuminate the interior light zone with the dominant color associated with the corresponding one of the plurality of geometric content zones.

2. The system of claim 1, wherein the at least one memory further comprises instructions that upon execution by the at least one processor, cause the at least one processor to divide the the first application specific content area into the plurality of geometric content area zones, wherein a number of geometric content area zones in the plurality of geometric content area zones is based on the first application.

3. The system of claim 1, wherein the at least one memory further comprises instructions that upon execution by the at least one processor, cause the at least one processor to map each of the plurality of geometric content area zones to the lamps associated with the corresponding one of the plurality of interior light zones in the vehicle using a mapping table, wherein the mapping table defines associations between the geometric content zones and the lamps in the interior light zones.

4. The system of claim 1, wherein the at least one memory further comprises instructions that upon execution by the at least one processor, cause the at least one processor to determine the dominant color in each of the plurality of geometric content area zones by identifying a color with a highest number of pixels in the geometric content area zone as the dominant color.

5. The system of claim 1, wherein the at least one memory further comprises instructions that upon execution by the at least one processor, cause the at least one processor to:

determine a vehicle status, wherein:

the vehicle status is one of a driving status and a parked status;

the driving status is associated with a driving interior light zone illumination update frequency;

the parked status is associated with a parked interior light zone illumination update frequency; and the driving interior light zone illumination update frequency is lower than the parked interior light zone illumination update frequency;

issue the first illumination command to the lamps in each of the plurality of interior light zones to illuminate the interior light zone with the dominant color associated with the corresponding one of the plurality of geometric content zones at a first time;

determine an updated dominant color in each of the plurality of geometric content area zones; and issue a second illumination command to the lamps in each of the plurality of interior light zones to illuminate the interior light zone with the updated dominant color associated with the corresponding one of the plurality of geometric content zones at a second time in accordance with one of the driving interior light zone illumination update frequency and the parked interior light zone illumination update frequency based on the vehicle status.

6. A method of synchronizing interior lighting and with a display screen in a vehicle comprising:

storing associations between a plurality of application identifiers and a plurality of application specific content areas on a display screen of the vehicle, wherein:

each of the plurality of application identifiers is associated with a corresponding application;

the application specific content area of the corresponding application on the display screen is used to display content associated with the application; and each of the plurality of application specific content areas is defined by a pre-defined height, a pre-defined width, a pre-defined horizontal offset with respect to a horizontal edge of the display screen, and a pre-defined vertical offset with respect to a vertical edge of the display screen;

receiving a first application identifier associated with first content displayed on the display screen from a central computing device of the vehicle, wherein the first application identifier is associated with a first application;

retrieving a first application specific content area associated with the first application identifier from the stored associations between the plurality of application identifiers and the plurality of application specific content areas;

determining the first application specific content area on the display screen based on a first pre-defined height, a first pre-defined width, a first pre-defined horizontal offset, and a first pre-defined vertical offset of the first application specific content area;

dividing the first application specific content area on the display screen into a plurality of geometric content area zones;

mapping each of the plurality of geometric content area zones to lamps associated with a corresponding one of a plurality of interior light zones in the vehicle;

determining a dominant color in each of the plurality of geometric content area zones; and issuing a first illumination command to the lamps each of the plurality of interior light zones to illuminate the interior light zone with the dominant color associated with the corresponding one of the plurality of geometric content zones.

7. The method of claim 6, further comprising dividing the first application specific content area into the plurality of geometric content area zones, wherein a number of geometric content area zones in the plurality of geometric content area zones is based on the first application.

8. The method of claim 6, further comprising mapping each of the plurality of geometric content area zones to the lamps associated with the corresponding one of the plurality of interior light zones in the vehicle using a mapping table, wherein the mapping table defines associations between the geometric content zones and the lamps in the interior light zones.

9. The method of claim 6, further comprising determining the dominant color in each of the plurality of geometric content area zones by identifying a color with a highest number of pixels in the geometric content area zone as the dominant color.

10. The method of claim 6, further comprising:

determining a vehicle status, wherein:

the vehicle status is one of a driving status and a parked status;

the driving status is associated with a driving interior light zone illumination update frequency;

the parked status is associated with a parked interior light zone illumination update frequency; and the driving interior light zone illumination update frequency is lower than the parked interior light zone illumination update frequency;

issuing the first illumination command to the lamps in each of the plurality of interior light zones to illuminate the interior light zone with the dominant color associated with the corresponding one of the plurality of geometric content zones at a first time;

determining an updated dominant color in each of the plurality of geometric content area zones; and issuing a second illumination command to the lamps in each of the plurality of interior light zones to illuminate the interior light zone with the updated dominant color associated with the corresponding one of the plurality of geometric content zones at a second time in accordance with one of the driving interior light zone illumination update frequency and the parked interior light zone illumination update frequency based on the vehicle status.

11. A vehicle including an interior lighting and display screen synchronization system comprising:

at least one processor; and at least one memory communicatively coupled to the at least one processor, the at least one memory comprising instructions that upon execution by the at least one processor, cause the at least one processor to:

store associations between a plurality of application identifiers and a plurality of application specific content areas on a display screen of the vehicle, wherein:

each of the plurality of application identifiers is associated with a corresponding application;

the application specific content area of the corresponding application on the display screen is used to display content associated with the application; and each of the plurality of application specific content areas is defined by a pre-defined height, a pre-defined width, a pre-defined horizontal offset with respect to a horizontal edge of the display screen, and a pre-defined vertical offset with respect to a vertical edge of the display screen;

receive a first application identifier associated with first content displayed on the display screen from a central computing device of the vehicle, wherein the first application identifier is associated with a first application;

retrieve a first application specific content area associated with the first application identifier from the stored associations between the plurality of application identifiers and the plurality of application specific content areas;

determine the first application specific content area on the display screen based on a first pre-defined height, a first pre-defined width, a first pre-defined horizontal offset, and a first pre-defined vertical offset of the first application specific content area;

divide the first application specific content area on the display screen into a plurality of geometric content area zones;

map each of the plurality of geometric content area zones to lamps associated with a corresponding one of a plurality of interior light zones in the vehicle;

determine a dominant color in each of the plurality of geometric content area zones; and issue a first illumination command to the lamps in each of the plurality of interior light zones to illuminate the interior light zone with the dominant color associated with the corresponding one of the plurality of geometric content zones.

12. The vehicle of claim 11, wherein the at least one memory further comprises instructions that upon execution by the at least one processor, cause the at least one processor to divide the application specific content area into the plurality of geometric content area zones, wherein a number of geometric content area zones in the plurality of geometric content area zones is based on the first application.

13. The vehicle of claim 11, wherein the at least one memory further comprises instructions that upon execution by the at least one processor, cause the at least one processor to map each of the plurality of geometric content area zones to the lamps associated with the corresponding one of the plurality of interior light zones in the vehicle using a mapping table, wherein the mapping table defines associations between the geometric content zones and the lamps in the interior light zones.

14. The vehicle of claim 11, wherein the at least one memory further comprises instructions that upon execution by the at least one processor, cause the at least one processor to determine the dominant color in each of the plurality of geometric content area zones by identifying a color with a highest number of pixels in the geometric content area zone as the dominant color.

15. The vehicle of claim 11, wherein the at least one memory further comprises instructions that upon execution by the at least one processor, cause the at least one processor to:

determine a vehicle status, wherein:

the vehicle status is one of a driving status and a parked status;

the driving status is associated with a driving interior light zone illumination update frequency;

the parked status is associated with a parked interior light zone illumination update frequency; and the driving interior light zone illumination update frequency is lower than the parked interior light zone illumination update frequency;

issue the first illumination command to the lamps in each of the plurality of interior light zones to illuminate the interior light zone with the dominant color associated with the corresponding one of the plurality of geometric content zones at a first time;

determine an updated dominant color in each of the plurality of geometric content area zones; and issue a second illumination command to the lamps in each of the plurality of interior light zones to illuminate the interior light zone with the updated dominant color associated with the corresponding one of the plurality of geometric content zones at a second time in accordance with one of the driving interior light zone illumination update frequency and the parked interior light zone illumination update frequency based on the vehicle status.

16. The vehicle of claim 11, wherein the plurality of geometric content area zones have non-rectangular shapes.

17. The vehicle of claim 11, wherein each application is associated with a pre-defined number of geometric content zones.

18. The vehicle of claim 17, wherein, each stored application specific content area comprises the pre-defined number of geometric content zones.

19. The vehicle of claim 11, wherein the first application specific content area comprises a partial display screen content area.

20. The vehicle of claim 19, wherein:

the first application comprises a music playback application; and the at least one memory further comprises instructions that upon execution by the at least one processor, cause the at least one processor to display cover art associated with music being played by the music playback application.

* * * * *